United States Patent
Dale et al.

(10) Patent No.: US 7,606,188 B2
(45) Date of Patent: *Oct. 20, 2009

(54) EXPLICIT CONGESTION NOTIFICATION FOR DOCSIS BASED BROADBAND COMMUNICATION SYSTEMS

(75) Inventors: Mark Dale, Laguna Hills, CA (US); David Hartman, Laguna Hills, CA (US); Dorothy Lin, Laguna Beach, CA (US); Rocco Brescia, Newport Coast, CA (US); Alan Gin, Corona Del Mar, CA (US); Ravi Bhaskaran, Irvine, CA (US); Jen-chieh Chien, Lake Forest, CA (US); Adel Fanous, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 11/633,630

(22) Filed: Dec. 5, 2006
(Under 37 CFR 1.47)

(65) Prior Publication Data
US 2007/0147281 A1    Jun. 28, 2007

Related U.S. Application Data

(63) Continuation of application No. 10/420,909, filed on Apr. 23, 2003, now Pat. No. 7,145,888.

(60) Provisional application No. 60/374,491, filed on Apr. 23, 2002.

(51) Int. Cl.
*H04B 7/212* (2006.01)
(52) U.S. Cl. .................... 370/321; 370/442; 370/447
(58) Field of Classification Search ............... None
See application file for complete search history.

(56) References Cited

U.S. PATENT DOCUMENTS
6,625,118 B1    9/2003   Hadi Salim et al.
(Continued)

OTHER PUBLICATIONS

Brown, Peter J., "Industry Players: Pushing Different Standards As Sector Enters New Phase," at http://telecomweb.com/cgi/pub/via/via05020504.html, 7 pages, May 2, 2005 (printed May 27, 2005).

(Continued)

*Primary Examiner*—Chi H Pham
*Assistant Examiner*—Soon-Dong D Hyun
(74) *Attorney, Agent, or Firm*—Sterne, Kessler, Goldstein & Fox P.L.L.C.

(57) ABSTRACT

Satellite communications are carried out using the Data Over Cable Interface Specification (DOCSIS). Satellite modems are notified of upstream channel congestion by inserting a congestion notification message in a medium access protocol (MAP) message for the upstream channel. Specifically, the congestion notification message is inserted in an unused field of the MAP message, such as the explicit congestion notification (ECN) field. The MAP message can also carry other characteristics of the upstream channel, including priority threshold, multicast access burst availability, and available bandwidth.

4 Claims, 8 Drawing Sheets

U.S. PATENT DOCUMENTS

| | | |
|---|---|---|
| 6,690,655 B1 | 2/2004 | Miner et al. |
| 6,741,555 B1 | 5/2004 | Li et al. |
| 6,742,187 B1 | 5/2004 | Vogel |
| 6,801,537 B1 | 10/2004 | Kubbar |
| 6,804,532 B1 | 10/2004 | Moon et al. |
| 6,853,680 B1 | 2/2005 | Nikolich |
| 2002/0031120 A1 | 3/2002 | Rakib |
| 2003/0026283 A1 | 2/2003 | Currivan et al. |

OTHER PUBLICATIONS

International Search Report from PCT Appl. No. PCT/US03/12641, filed Apr. 23, 2003, 6 pages.

Data-Over-Cable Service Interface Specifications, Radio Frequency Interface Specification (SP-RFIv1.1-I09-020830), Cable Television Laboratories, Inc., Copyright 1999-2002.

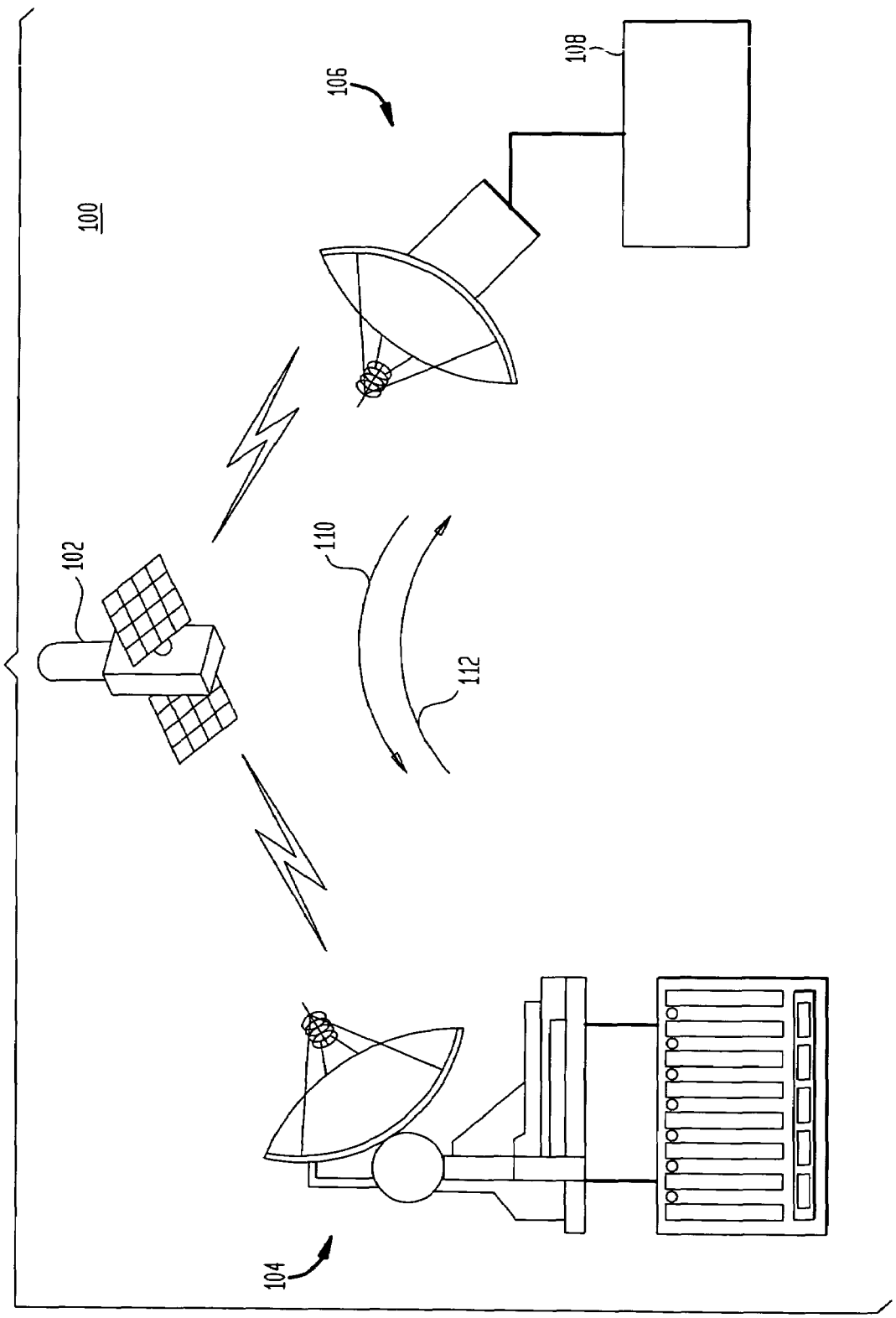

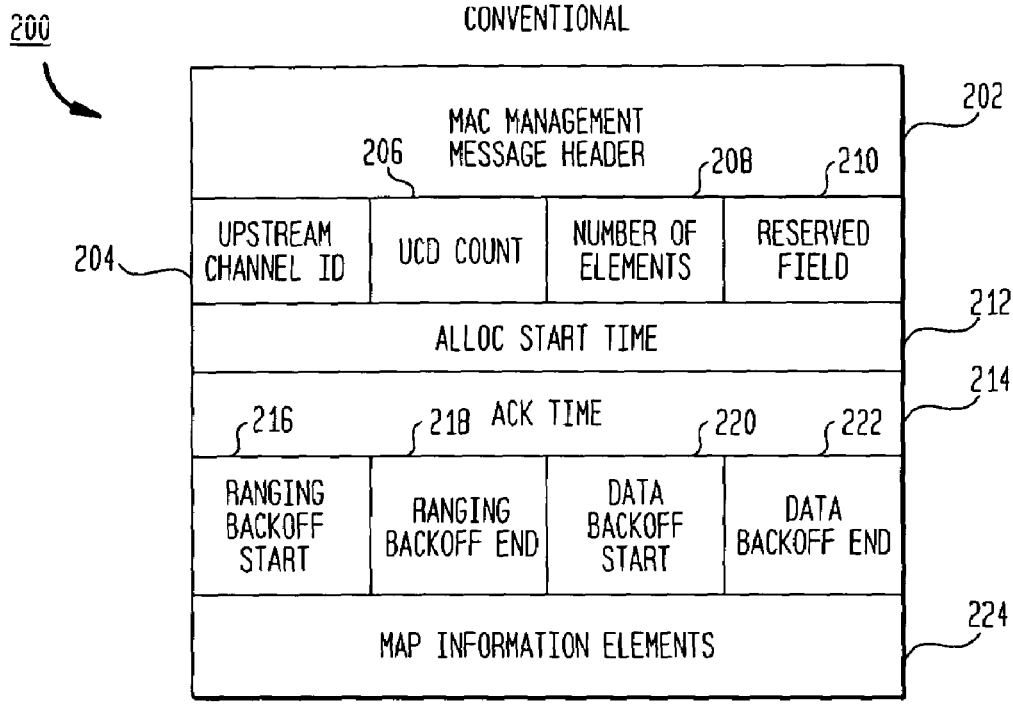
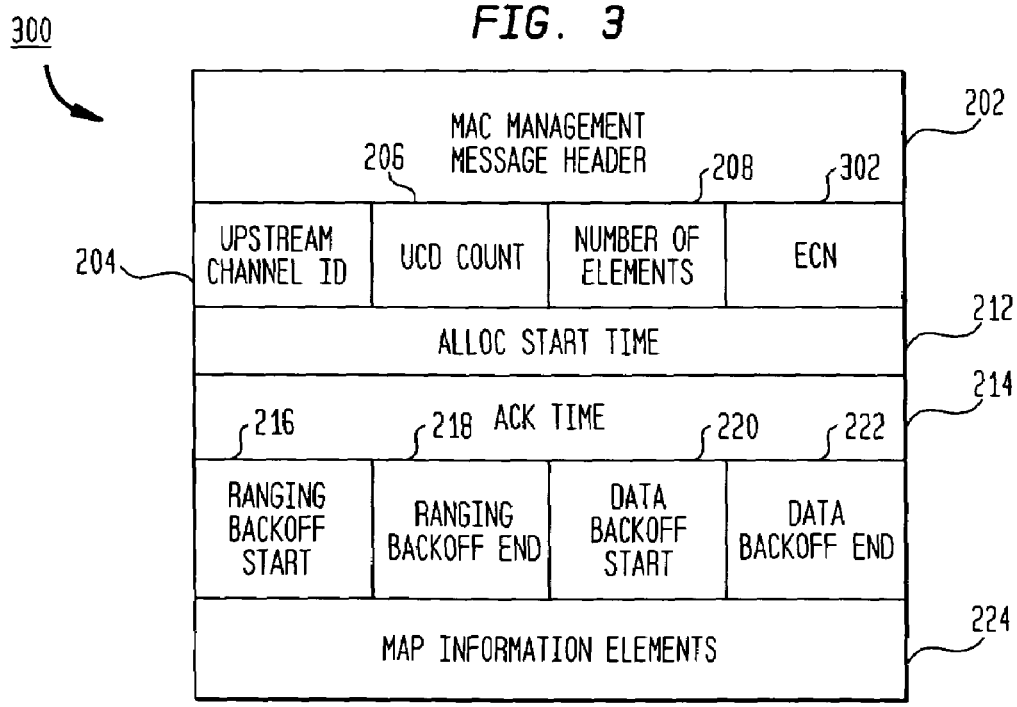

EXPLICIT CONGESTION NOTIFICATION FOR DOCSIS BASED BROADBAND COMMUNICATION SYSTEMS

CROSS-REFERENCE TO RELATED APPLICATIONS

This application is a continuation of U.S. Non-Provisional application Ser. No. 10/420,909, filed Apr. 23, 2003, now U.S. Pat. No. 7,145,888, Issued: Dec. 5, 2006, which claims the benefit of U.S. Provisional Patent Application No. 60/374,491, filed on Apr. 23, 2002, all of which are incorporated herein by reference in its entirety.

BACKGROUND OF THE INVENTION

1. Field of the Invention

The present invention relates to using the Data Over Cable Service Interface Specification (DOCSIS) to identify characteristics of a satellite communications system. More specifically, the DOCSIS specification can be used to indicate a message collision in the upstream channel of a satellite communications system.

2. Description of the Related Art

In DOCSIS related broadband data communications architectures, data is transferred between a central location and many remote subscribers. Terms for the centrally located equipment include Headend (cable systems), Wireless Access Termination System (WATS—broadband terrestrial fixed wireless), or Satellite Gateway (two-way satellite). Terms for the subscriber equipment include Cable Modem (CM—cable systems), Wireless Modem (WM—broadband terrestrial fixed wireless) or Satellite Modem (SM—two-way satellite). For the remainder of this document, the satellite terminology will be used in the description of this invention. The communication path from the Gateway to the SM is called the downstream. The communication path from the SM back to the Gateway is called the upstream. FIG. 1 illustrates a high level diagram.

In standard DOCSIS based systems, traffic for many SMs is placed in Time Domain Multiplex (TDM) fashion on a downstream channel. SMs also share upstream channels in a Time Domain Multiple Access (TDMA) fashion. If a SM is using a given downstream, its upstream traffic is assigned to one of typically several upstream channels that are associated with each downstream. The set of the downstream channel and the corresponding upstream channels is sometimes called a MAC Domain.

In order to allow SMs to share upstream channels, the Gateway sends bandwidth grant map messages to the SMs for each upstream in the MAC domain of the downstream. In the DOCSIS protocol, these messages are referred to as MAP messages. The MAP messages identify burst types, give start times, duration's for each SM that is granted bandwidth on a given upstream channel. The MAP messages also identify time interval for initial ranging, for SMs that wish to attempt to register for the first time on the channel, and multicast Request Access windows, for SMs that wish to make bandwidth requests.

Both initial maintenance bursts, and multicast request access regions are contention type requests. This means that multiple users may attempt to utilize a given burst time simultaneously. If this occurs, there is a "collision" and the burst from both SMs are lost. The DOCSIS protocol has a algorithm by which the SMs recognize that a collision has occurred and retry their burst at random back-off intervals. When a given upstream channel is very congested, there is a significant probability that a SM's burst might suffer from several collisions before it gets through successfully.

In satellite channels, a collision event is more detrimental to system performance due to the long delays involved. What is needed is a mechanism to signal to SMs whether congestion exists on a given upstream so that collision events can be reduced during initial ranging and when multicast bandwidth requests are used.

BRIEF SUMMARY OF THE INVENTION

The present invention refers to the adaptation of the existing DOCSIS data over cable specification to enable characterization of satellite applications.

More precisely, the invention refers to a method for generating a congestion notification message for an upstream channel of a DOCSIS satellite communications system that serves a plurality of satellite modems. The method consists of detecting a message collision in the upstream channel of the DOCSIS satellite communications system, generating a medium access protocol (MAP) message that identifies the message collision in an unused field of the MAP message. The method further comprises the step of sending the MAP message to at least one of a plurality of satellite modems.

In one embodiment, the explicit congestion notification (ECN) field of the MAP message is used to indicate the message collision. The ECN field can also be used to indicate other characteristics of the upstream channel, including a priority threshold for the satellite modems to register, multicast access burst availability, and the available bandwidth of the upstream channel.

BRIEF DESCRIPTION OF THE DRAWINGS/FIGURES

The accompanying drawings which are incorporated therein and form a part of the specification illustrate the present invention and together with the description further serve to explain the principles of the invention and to enable a person skilled in the present art to make and use the invention.

FIG. 1 illustrates a satellite communication system.

FIG. 2 is a conventional upstream MAP message.

FIG. 3 further illustrates a MAP message according to embodiments of the present invention.

Figure 4:
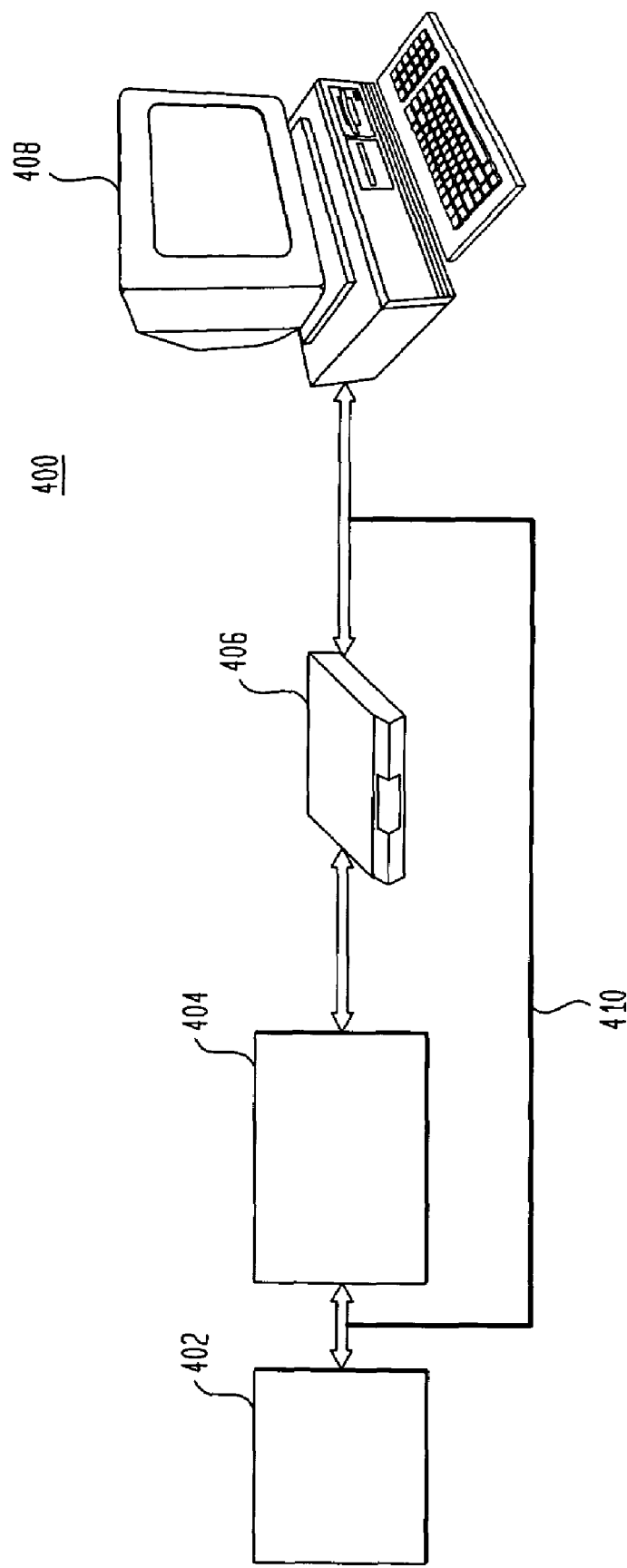
Figure 5:
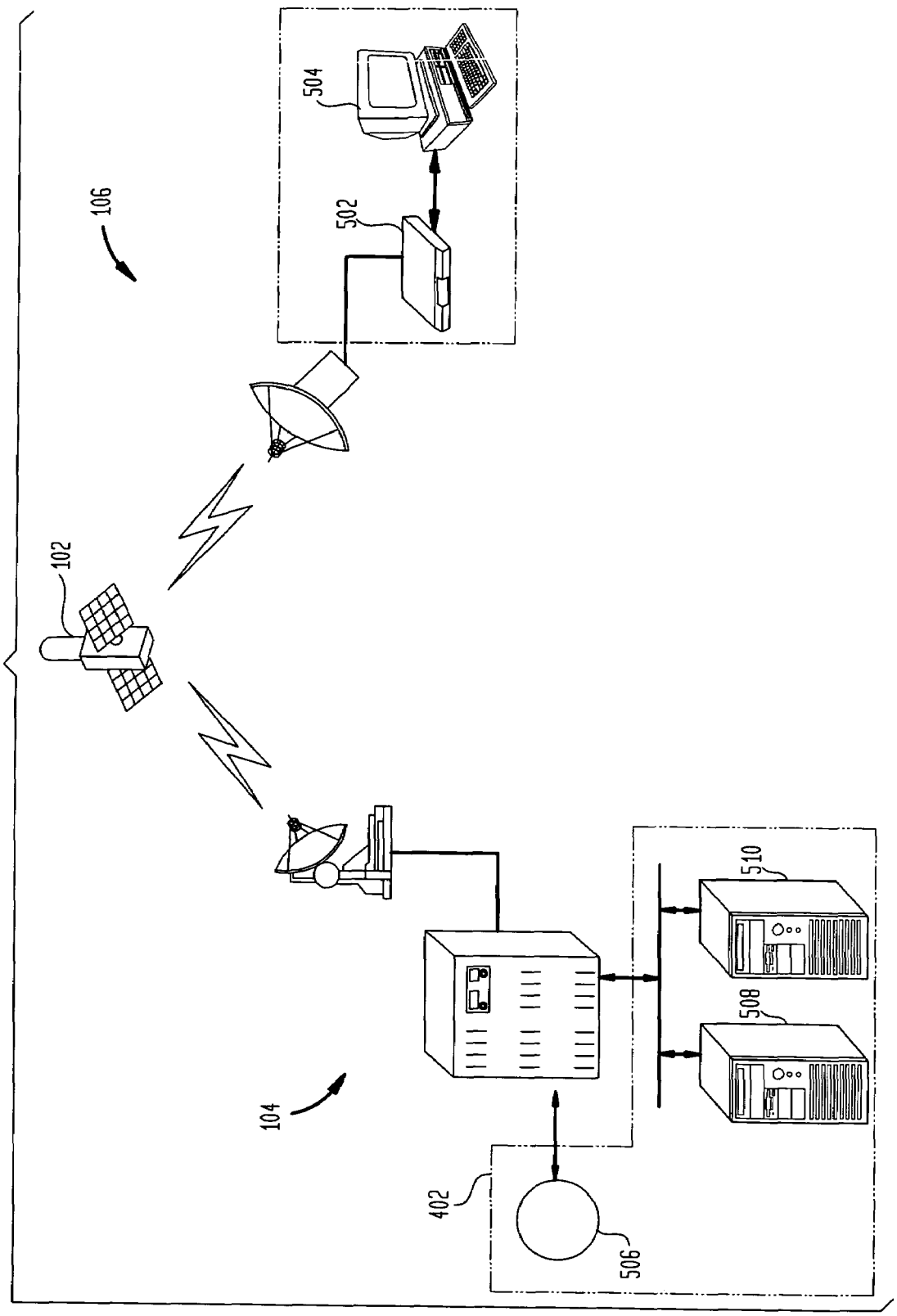

FIGS. 4 and 5 further illustrate the physical sub-layer of the satellite systems that make use of the present invention.

Figure 6:
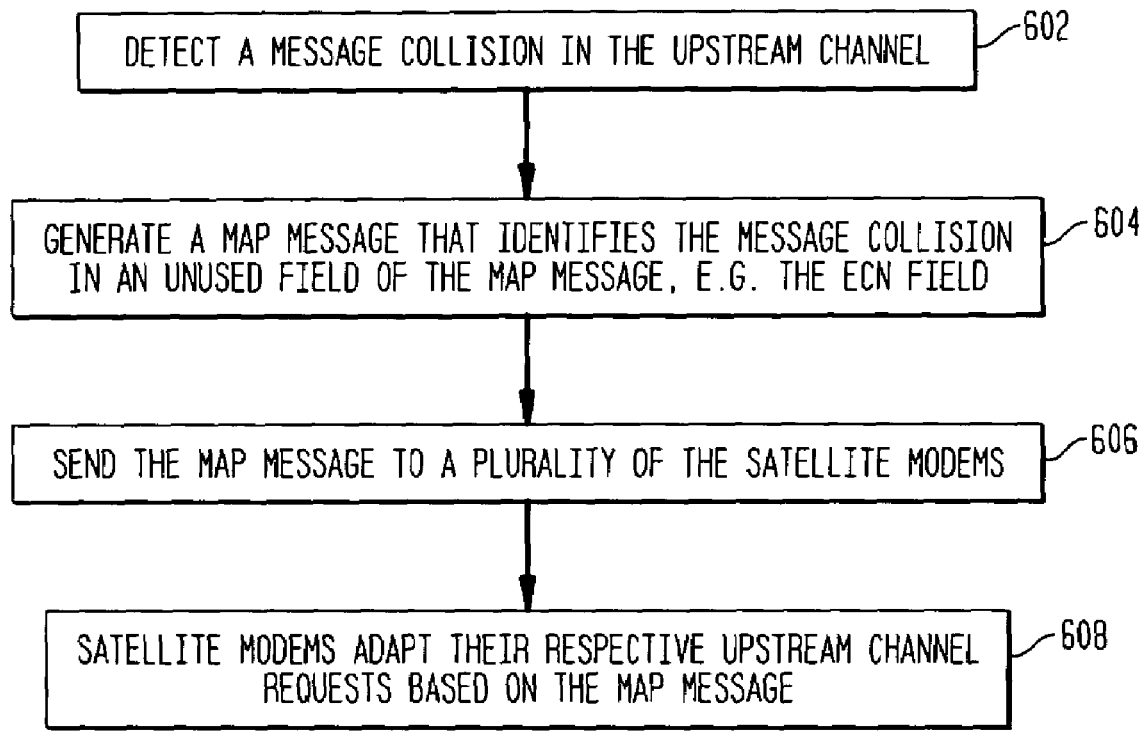

FIG. 6 is a flowchart that illustrates the use of a MAP message to indicate a message collision in the upstream channel according to embodiments of the present invention.

Figure 7:
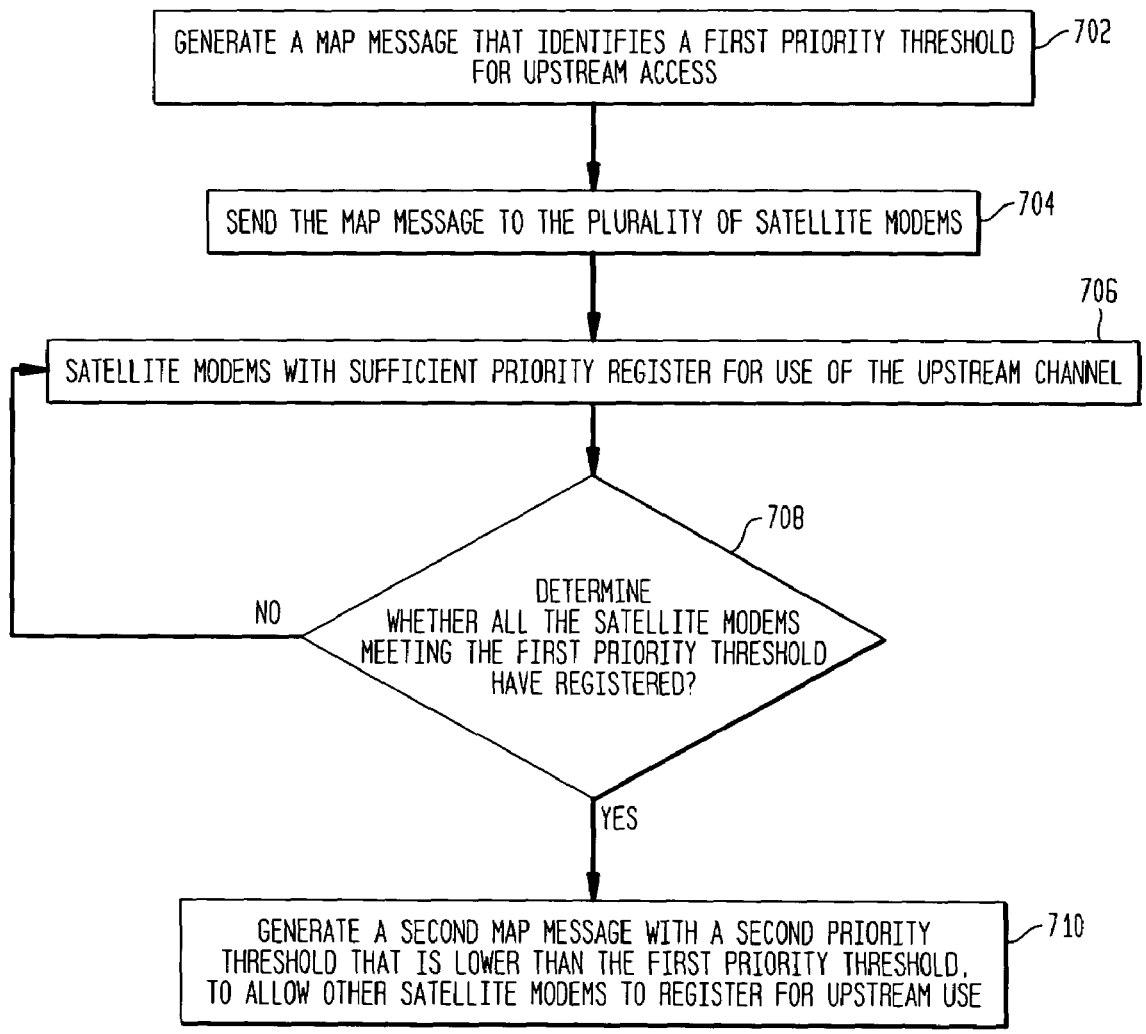

FIG. 7 is a flowchart that illustrates the use of a MAP message to identify modem priority requirements according to embodiments of the present invention.

Figure 8:
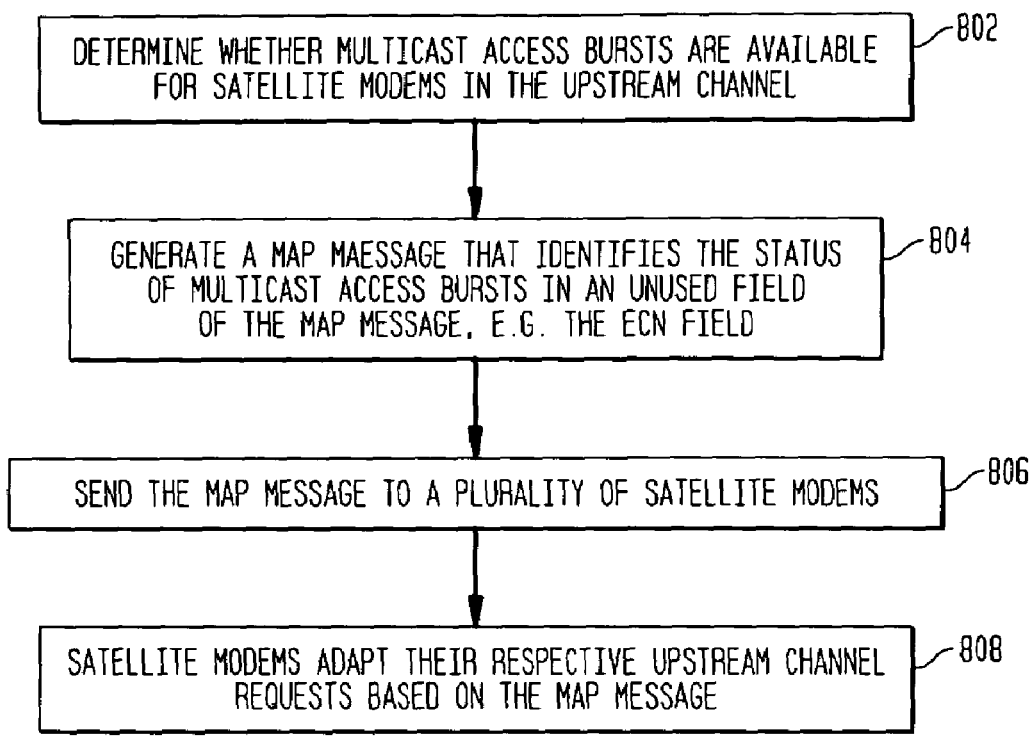

FIG. 8 is a flowchart that illustrates the use of a MAP message to identify the status of multicasts access bursts according to embodiments of the present invention.

Figure 9:
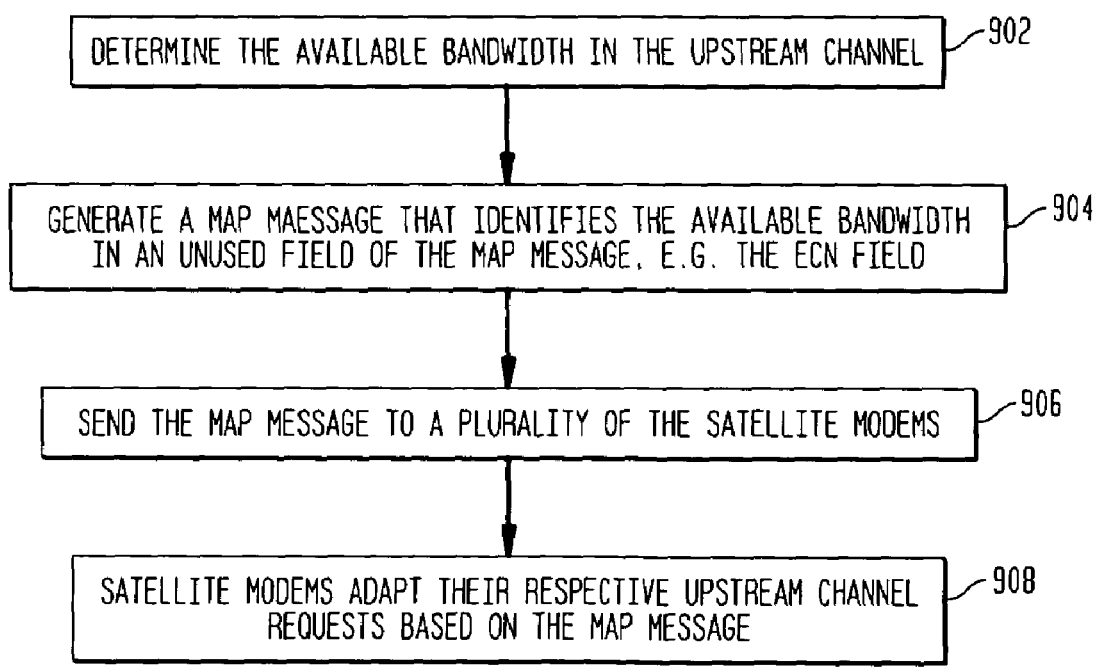

FIG. 9 is a flowchart that illustrates the use of a MAP message to identify the available bandwidth of the upstream channel according to embodiments of the present invention.

Figure 10:
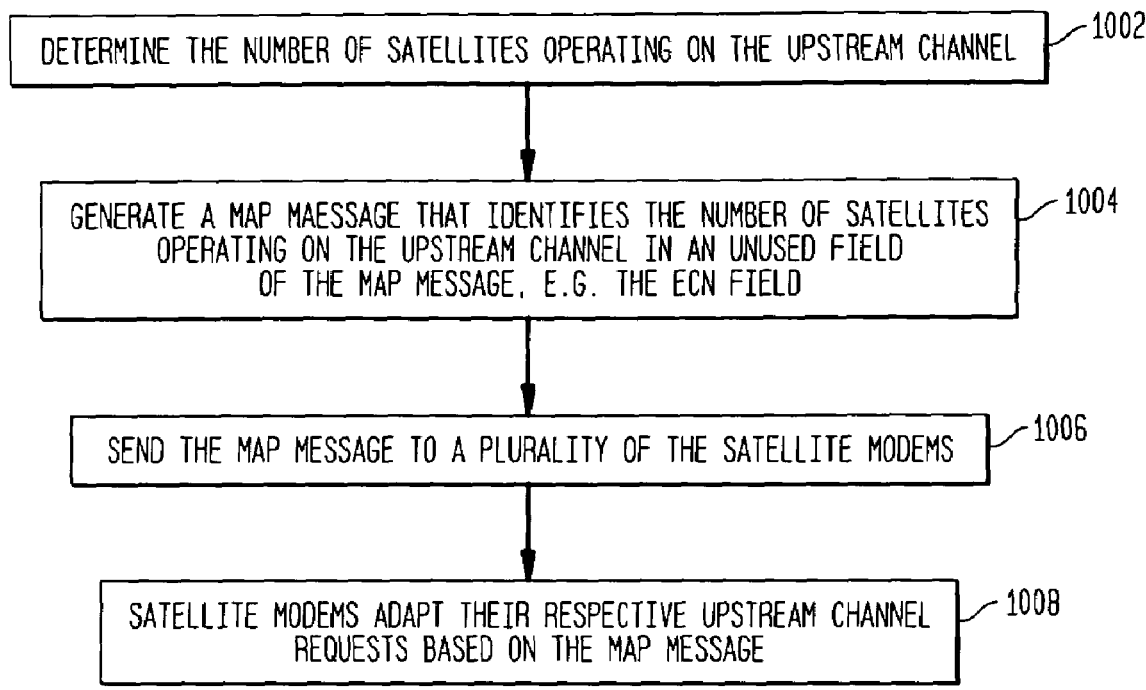

FIG. 10 is a flowchart that illustrates the use of a MAP message to identify the number of satellites using the upstream channel according to embodiments of the present invention.

Figure 11:
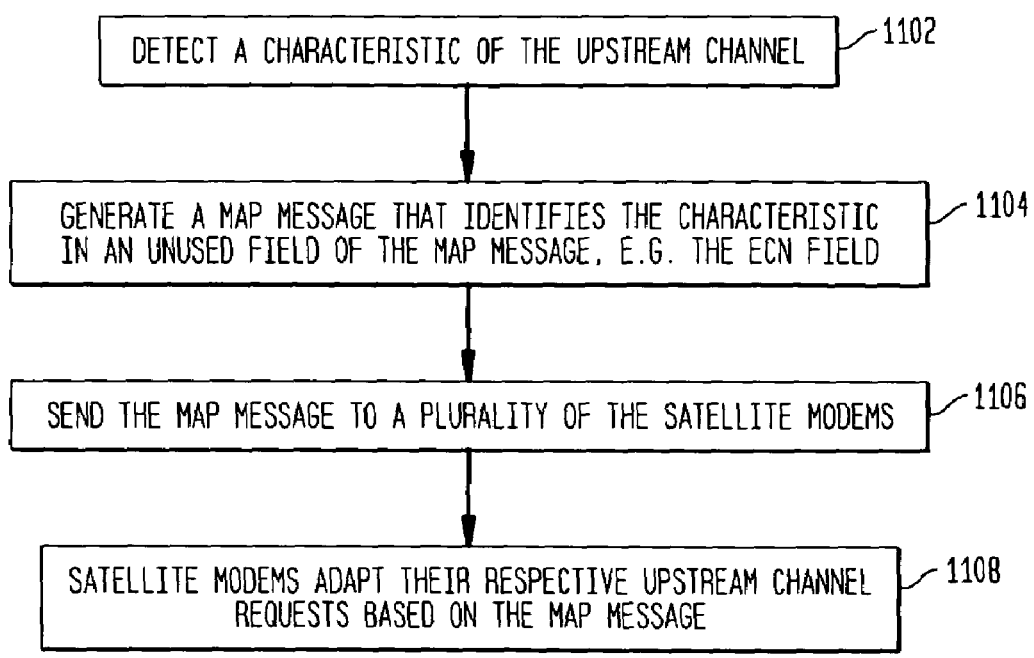

FIG. 11 is a flowchart that illustrates the use of a MAP message to identify any of a number of characteristics of the upstream channel according to embodiments of the present invention.

The present invention will now be described with reference to the accompanying drawings. In the drawings alike reference numbers indicate identical or functionally similar elements. Additionally, the last most digits of a reference number identifies the drawing in which the reference number first appears.

DETAILED DESCRIPTION OF THE INVENTION

Broadband Communication Systems Based on DOCSIS Specification Technology Overview In Data Over Cable Service Interface Specification (DOCSIS) based broadband data communication architectures, data is transferred between a central location and many remote subscribers. The centrally located equipment could be a Headend (cable system), Wireless Access Termination System (WATS—broadband terrestrial fixed wireless), Satellite Gateway (two way satellite). The subscriber equipment would be a Cable Modem (CM—cable system), Wireless Modem (WM—broadband terrestrial fixed wireless), and Satellite Modem (SM—two-way satellite).

The communication path from the gateway to the satellite modem is the downstream. The communication path from the satellite modem back to the gateway is the upstream. FIG. 1 illustrates the elements of a satellite Internet communication system 100.

The satellite communication system 100 consists of a satellite 102, gateway 104, and satellite modem 106. Upstream 110 is established from the satellite modem under 106 towards the gateway 104. Downstream 112 is established from the gateway 104 towards the satellite 106.

In standard DOCSIS based systems, traffic for many SMs is placed in time domain multiplex (TDM) fashion on a downstream channel. The satellite modem also shares upstream channels in the time domain multiplex (TDM) fashion. If a satellite modem is using a given downstream channel, its upstream traffic is assigned to one of typically several upstream channels that are associated with each downstream channel. The set of downstream channel and the corresponding upstream channels is the Media Access Control (MAC) domain of the satellite system.

In order to allow satellite modems to share upstream channels, the gateway 104 sends bandwidth grant allocation media access protocol messages (MAP) messages to the satellite modems 106 for each upstream in the media access control (MAC) domain of the downstream. The MAP messages identify burst types, and provide time intervals for each satellite modem that is granted bandwidth on a given upstream. The MAP messages also identify a time interval for initial ranging for satellite modems that wish to attempt to register for the first time on a channel. The MAP messages also identify access windows for the satellite modems that wish to make bandwidth requests.

FIG. 2 shows a conventional MAP message 200. MAP message 200 includes fields such as the MAC management message header 202 that is partitioned into an upstream channel ID 204, a UCD count 206, a number of elements or mini-slot size 208, and a reserved field 210. The other fields in the DOCSIS 1 format are also present including, for example, Alloc Start Time 212, Ack Time 214, ranging back off start 216, ranging back off end 218, data back off start 220, and data back off end 222. The Alloc Start Time 212, Ack Time 214, ranging back off start 216, ranging back off end 218, data back off start 220, and data back off end 222 are all related to burst description. Furthermore, the MAP message 200 also includes MAP information elements 224.

Both initial maintenance burst and multicast request access regions are contention type requests. Multiple users may attempt to utilize a given burst time simultaneously. If this occurs, there is a "collision" and the bursts from both satellite modems are lost. The classical DOCSIS protocol has an algorithm by which the satellite modems recognize that a collision has occurred and retry their burst at random back-off intervals. When a given upstream channel is very congested, there is a significant probability that a satellite modem burst will suffer several collisions before it gets through successfully.

A collision event is detrimental to the system's performance due to the long time delays involved. Satellite modems need a mechanism to indicate them whether there is congestion on a given upstream channel. Such a mechanism allows the number of collision events to be reduced during initial ranging and when multicast requests are made.

For the DOCSIS based systems, MAP messages have a well known format. One format for MAP messages is illustrated in FIG. 2. The format of the MAP message is further described in document number SP-RFIv1.1-I08-020301, which is called DOCSIS Radio Frequency Interface (RFI) and can be found on the following WEB site www.cablemodem.com. This document is referred to as DOCSIS 1 for the purpose of this disclosure. The DOCSIS 1 document further describes the fields in the DOCSIS 1 format, and is incorporated by reference herein in its entirety.

An Upstream Channel Descriptor must be transmitted by the Cable Modem Termination System (CATS) at a periodic interval to define the characteristics of an upstream channel. A separate message must be transmitted for each active upstream channel. To provide for flexibility, the message parameters following the channel ID must be encoded in a type/length/value (TLV) form in which the type and length fields are each 1 octet long.

The existing DOCSIS 1 MAP message 200 contains a reserved field that is not utilized in current cable systems.

FIG. 3 illustrates MAP message 300 according to the present invention. MAP message 300 contains fields similar to the format illustrated by FIG. 2. For instance, MAP message 300 includes upstream channel ID 204, UCD count 206, number of elements or mini-slot size 208, Alloc Start Time 212, Ack Time 214, ranging back off start 216, ranging back off end 218, data back off start 220, and data back off end 222. The Alloc Start Time 212, Ack Time 214, ranging back off start 216, ranging back off end 218, data back off start 220 and data back off end 222 are all related to burst description.

Furthermore, the MAP message 300 also includes the MAP information elements 224.

MAP message 300 differs from MAP message 200 in that an explicit notification (ECN) field 302 replaces the reserved field 210. In the DOCSIS 1 format, the ECN field 302 replaces an unused/reserved field.

According to the embodiments of the present invention, the ECN field 302 is an 8 bit field that can be used to indicate the presence of any congestion experienced by satellite modems attempting to use the upstream channel. The ECN field 302 can be used in a variety of ways to indicate congestion, as will be discussed below.

FIG. 4 and FIG. 5 further help to illustrate the physical sub-layer of the satellite systems that make use of the present invention.

FIG. 4 illustrates an example of transparent internet protocol (IP) traffic through a satellite access system 400. The system 400 consists of a data network 402, a satellite modem termination system 404, a satellite modem 406, a CPE 408. The IP traffic 410 is established through the satellite access system as illustrated in FIG. 4. The satellite communications system 400 will allow transparent bidirectional transfer of internet protocol traffic 410 between the satellite modem termination system (SMTS) 404 and the satellite modems (SM) at the customers premises.

FIG. 5 illustrates the reference architecture for a wireless satellite based communication system. The satellite communication system consists of an satellite unit 102, a transceiver 104, a satellite modem termination system 404, a backbone network 506, a security server 508, an operation support system 510, an outdoor unit 106, an indoor unit 502 and equipment at customer's premises 504.

Methods of the Present Invention

The explicit congestion notification (ECN) field 302 can be used in a variety of ways or methods to avoid initial ranging congestion, to indicate RA availability, to indicate the number of satellite modems on the channel, and to indicate the maximum bandwidth available. The uses for the ECN field are not limited to the ones mentioned above. In general, the ECN field 302 can be used to represent general characteristics of the upstream channel.

One method according to the present invention refers to a method for generating a congestion notification message in an upstream channel of a Data Over Cable Interface Specification (DOCSIS) communications system. A message collision is detected in the upstream channel of the Data Over Cable Interface Specification (DOCSIS) communications system. In the upstream channel, an upstream bandwidth allocation map message (MAP) is generated. A reserved field of the upstream bandwidth map message (MAP) is used to indicate the message collision. In one embodiment, the reserved field is the explicit congestion notification (ECN) field 302. While congestion is present, the ECN Field 302 of the MAP message is modified to indicate the presence of congestion.

In one embodiment, the explicit congestion notification field 302 is an 8 bit field. The 8 bits of the ECN field 302 are the most significant bits of the upstream MAP message.

The ECN field 302 is used to carry the congestion notification message to the satellite modems 106 in the event that a collision occurs during initial ranging. Initial ranging congestion can occur in the event of a system error if a temporary loss of the downstream channel forces many satellite modems to try to register back with the system in the same time, an initial ranging congestion occurs. The ECN field is used to control the satellite modem's access to initial ranging. One of the 8 bits of the ECN field is used to indicate whether or not there is initial maintenance congestion on the upstream channel. If the bit is 0, no initial maintenance congestion is present on the upstream channel. If the bit is 1, then there is initial maintenance congestion on the upstream.

FIG. 6 illustrates a flowchart 600 for using the MAP message to indicate collision on the upstream channel. In step 602, a message collision is detected in the upstream channel of the DOCSIS communications system. In step 604, a MAP message having a plurality of fields is generated that identifies the message collision in an unused field of the MAP message, e.g. the ECN field. In step 606, the MAP message is sent to a plurality of satellite modems (or other type of modem) that are served by the DOCSIS communications system. In step 608, the satellite modems adapt their respective upstream channel requests based on the received MAP message.

In one embodiment, priority among competing satellite modems is determined using a subfield consisting of the ECN field 302. For instance, a priority subfield can be used to indicate the priority that the satellite modems must have in order to utilize the initial ranging/maintenance opportunities of the upstream channel. After all the high priority satellite modems have successfully registered, the priority subfield of the ECN field is lowered. This will allow other lower priority satellite modems to register with the upstream channel use. For example, the priority subfield can include between 1-4 bits of the ECN field.

FIG. 7 further describes the priority determination using the ECN of the MAP message. In step 702, a MAP message is generated that identifies a first priority threshold needed for a satellite modem to use the upstream channel. The priority threshold can be carried in any unused field of the MAP message, for example, the ECN field. In step 704, the MAP message is sent to the plurality of satellite modems. In step 706, satellite modems with sufficient priority register for use of the upstream channel. In step 708, it is determined whether all the satellite modems meeting the first priority threshold have registered. If so, in step 710, a second MAP message is generated with a second priority threshold that is lower than the first priority threshold, to allow other satellite modems to register for upstream use. The priority threshold can be continuously lowered until all of the satellite modems have registered.

In one priority embodiment, the satellite modem generates a random number that represents the relative priority of the satellite modem. If the random number is below the threshold, then the satellite modem will wait to register for upstream access. The wait time for the satellite modem can be predetermined and varied. Both the satellite modem and the gateway are aware of the amount of wait time. After waiting the set amount of time, the satellite modem attempts again to register on the communication system. If the congestion on the channel has eased, the gateway lowers the threshold and more satellite modems will register successfully.

Another method of the present invention uses the ECN field 302 to indicate whether or not there is multicast RA availability. In other words, the ECN field in the MAP message indicates whether multicast access bursts are available to the satellite modems. For instance, if all the 8 bits (or a subset) of the ECN field are set, then the satellite modem interprets that the multicast request access bursts are restricted on the upstream channel.

FIG. 8 further illustrates the use of the ECN field to indicate whether multicast access bursts are available for the satellite modems. In step 802, it is determined whether multicast access bursts are available for satellite modems in the upstream channel of the DOCSIS communications system. In step 804, a MAP message having a plurality of fields is generated that identifies the status of the multicast access bursts in an unused field of the MAP message, e.g. the ECN field. In step 806, the MAP message is sent to a plurality of satellite modems (or other type of modem) that are served by the DOCSIS communications system. In step 808, the satellite modems adapt their respective upstream channel requests based on the received MAP message.

For instance, two bits of the ECN field can be used indicate multicast request access availability, where the four possible combinations are 00, 01, 10 and 11.

If the highest most significant bit is set on 0 and the second highest most significant bit is also set on 0, the satellite modem will interpret that multicast request access bursts are available to all satellite modems.

If the highest most significant bit is set on 0 and the second most significant bit is set on 1, the satellite modem will interpret that multicast request access bursts are available to the satellite modems, with priority starting at the second highest or higher.

If the highest most significant bit is set on 1 and the second most significant bit is set on 0, the satellite modem will interpret that multicast request access bursts are available to satellite modems with the highest priority.

If both the highest most significant bit and the second highest most significant bit are set on 1, the satellite modems will interpret that no multicast request access bursts are available.

In another embodiment, the ECN field 302 is used to indicate the maximum upstream bandwidth available that can be assigned to the satellite modems for unsolicited grant service, in addition to message congestion. The satellite modems monitor the multiple upstream MAP messages. The satellite modems monitor the congestion indicated onto the ECN field of the MAP messages, and attempt to register on the upstream channel that exhibits the least congestion, and that has sufficient bandwidth.

FIG. 9 further illustrates the use of the ECN field to indicate the available bandwidth for the satellite modems. In step 902 the available bandwidth is determined for an upstream channel of the DOCSIS communications system. In step 904, a MAP message having a plurality of fields is generated that identifies the available bandwidth in an unused field of the MAP message, e.g. the ECN field. In step 906, the MAP message is sent to a plurality of satellite modems (or other type of modem) that are served by the DOCSIS communications system. In step 908, the satellite modems adapt their respective upstream channel requests based on the received MAP message.

Another method of the present invention refers to the use of the ECN field of a MAP format to indicate the number of active satellite modems on the upstream channel. A satellite modem monitors the ECN field of an MAP format of the upstream channel to see how many other satellite modems are active on the same channel. This information is used to optimize the back-off algorithm parameters of the system. FIG. 10 further illustrates this embodiment.

The specific embodiments of using the MAP message to indicate characteristics of the upstream channel can be further described, and generalized in FIG. 11. In step 1102, a characteristic of the upstream channel is determined. In step 1104, a MAP message is generated that identifies the characteristic of the upstream channel in an unused field of the MAP message. In step 1106, the MAP message is sent to a plurality of satellite modems (or other type of modem) that are served by the DOCSIS communications system. In step 1108, the satellite modems adapt their respective upstream channel requests based on the received MAP message.

What is claimed is:

1. A method of identifying a message collision in an upstream channel of a satellite based DOCSIS communications system, comprising:

generating, by a satellite gateway, a media access protocol (MAP) message having a plurality of fields, the generating including identifying a message collision between satellite modems in an unused explicit congestion notification (ECN) field of the MAP message, wherein the ECN field (i) is a reserved field in a standard Data Over Cable Interface Specification 1.1 MAP message and (ii) includes at least one subfield.

2. The method of claim 1, further comprising the step of:

sending the MAP message to a plurality of satellite modems that are served by the satellite-based DOCSIS communications system.

3. The method of claim 1, wherein the ECN field is an 8 bit field in the MAP message.

4. The method of claim 1, wherein the message collision between the satellite modems occurs during initial ranging.

* * * * *